United States Patent [19]

Fushiya et al.

[11] Patent Number: 4,625,406
[45] Date of Patent: Dec. 2, 1986

[54] SAFETY DEVICE FOR A PORTABLE CHAIN SAW

[75] Inventors: Fusao Fushiya; Nobuhiro Inoue, both of Anjo, Japan

[73] Assignee: Makita Electric Works, Ltd., Anjo, Japan

[21] Appl. No.: 712,198

[22] Filed: Mar. 15, 1985

[30] Foreign Application Priority Data

Mar. 21, 1984 [JP] Japan ............................ 59-41131[U]

[51] Int. Cl.⁴ .......................................... B23D 57/02
[52] U.S. Cl. .................................... 30/381; 188/166; 188/77 R
[58] Field of Search ................ 30/381, 382, 383, 384; 188/77 W, 77 R, 166; 192/12 R, 17 R, 17 D

[56] References Cited

U.S. PATENT DOCUMENTS

| | | | |
|---|---|---|---|
| 2,675,835 | 4/1954 | Kiekhaefer | 30/383 |
| 3,237,741 | 3/1966 | Potter et al. | 188/166 X |
| 3,785,465 | 1/1974 | Johansson | 30/383 X |
| 4,140,209 | 2/1979 | Muller | 192/17 R |
| 4,328,617 | 5/1982 | Satoh | 30/382 |

Primary Examiner—E. R. Kazenske
Assistant Examiner—Willmon Fridie, Jr.
Attorney, Agent, or Firm—Dennison, Meserole, Pollack & Scheiner

[57] ABSTRACT

A safety device for a chain saw conventional in its overall construction is disclosed which comprises mainly a brake lever pivotally supported by the housing of the chain saw and arranged to stop the cutting chain when the brake lever is actuated either by inertia or by engagement with the operator's hand. The brake lever is formed with a cam surface adapted to press an engaging member connected to the drive shaft out of meshing engagement with an interlocking wheel for driving the cutting chain so as to shut off the driving power to be transmitted to the interlocking wheel. The brake lever also includes a braking member secured thereto and adapted for movement therewith in synchronism with the arcuate movement of the cam surface, into frictional braking engagement with the interlocking wheel for effecting a brake effect on the cutting chain.

5 Claims, 8 Drawing Figures

SAFETY DEVICE FOR A PORTABLE CHAIN SAW

BACKGROUND OF THE INVENTION

1. Field of the Invention

The present invention relates to hand portable chain saws, and more particularly to a safety device for such chain saws which is operable to prevent the risk of operator injury which may be caused by the cutting chain when the operator was subjected to a sudden movement of the chain saw, as in the case of "kickback", or when the operator's hand slipped from the front hand grip of the saw toward the cutting chain.

2. Description of the Prior Art

It is known that hand portable chain saws are subject to a so called kickback motion during a cutting operation, since the cutting chain may often engage a solid object such as a branch at the tip of the guide bar thereby causing an abrupt upward movement of the chain saw. This abrupt action of the chain saw may cause the moving cutting chain to come into contact with the operator's body thereby resulting in serious injury. Further, when the operator, in attempting to perform an untoward cutting operation, is using a downward force to the grip, or by reason of inadvertency, his hand may slip from the hand grip of the saw into contact with the cutting chain.

The prior art has proposed various safety devices for preventing the above-noted unexpected accidents in connection with chain saws. Such a safety device is known from the U.S. Pat. No. 3,776,331 issued to Lennart Gustafsson, wherein a trigger means (a safety brake lever) serves to release a locking mechanism and apply a spring force to a brake band around the drum for driving the cutting chain, thereby arresting the rotational movement of the drum in the event of a kickback. However, this device is rather complicated, incorporating an intermediate lever and other elements in the braking mechanism extending from the trigger means to the brake band. Thus, in this device the transmission of braking force is indirect and complicated, there being possible delay in actual braking time.

SUMMARY OF THE INVENTION

It is, accordingly, an object of the present invention to eliminate the disadvantages enumerated above by providing a novel safety device for chain saws which, in the event of emergency, functions to instantaneously apply a braking force to a chain wheel for driving the cutting chain and at the same time, to shut off the driving power from the motor to be transmitted to the chain wheel.

It is another object of the present invention to provide a novel safety device for chain saws which is reliable, simple in construction and may be manufactured at low cost.

It is a further object of the present invention to provide a novel safety device for chain saws which may positively enhance the braking effect on the chain saw in the event of untoward movement of the saw.

According to the present invention, there is provided a safety device for a chain saw conventional in its overall construction which comprises mainly a brake lever pivotally supported by the housing of the chain saw and arranged to stop the cutting chain when the brake lever is actuated either by inertia or by engagement with the operator's hand. The brake lever is formed with a cam surface adapted to press an engaging member connected to the drive shaft out of meshing engagement with an interlocking wheel for driving the cutting chain so as to shut off the driving power to be transmitted to the interlocking wheel. The brake lever also includes a braking member secured thereto and adapted for movement therewith in synchronism with the arcuate movement of the cam surface, into frictional braking engagement with the interlocking wheel for effecting a brake effect on the cutting chain. Thus, the force of the brake lever is advantegeously utilized both for braking and power shut-off thereby enhancing the simplicity of the construction and the safety of the chain saw.

The present invention will become more fully apparent from the claims and description as it proceeds in connection with the drawings.

DETAILED DESCRIPTION OF THE PREFERRED EMBODIMENTS

Figure 1:
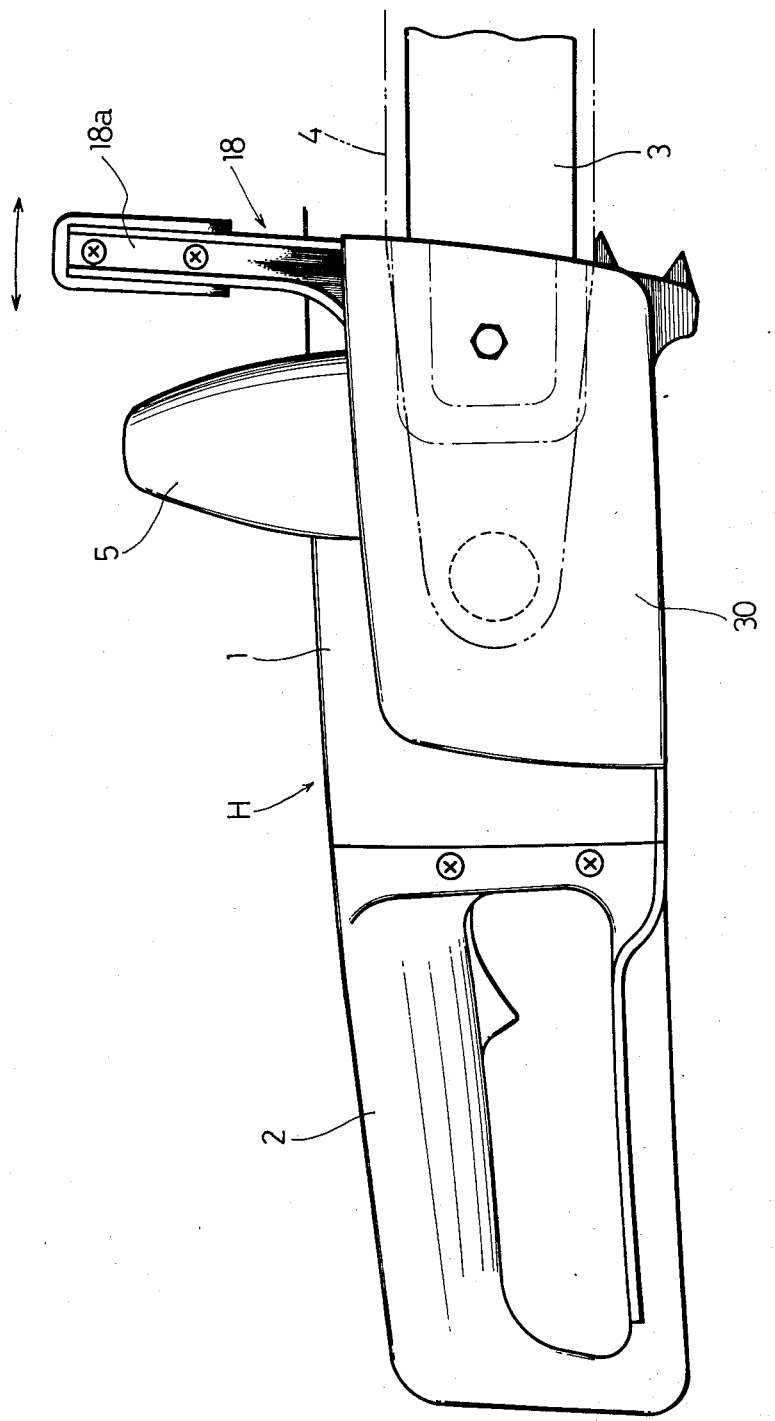
FIG. 1 is a side elevational view of a chain saw embodying the present invention.

Referring to the drawings and to FIG. 1 in particular, shown therein is a hand portable chain saw H embodying the present invention. As shown therein, the chain saw H includes a housing 1 having a handle 2 secured to the rearward end thereof and adapted to be grasped mainly by the operator's right hand. The housing 1 mounts a forwardly extending guide bar 3 which supports a cutting chain 4. The housing 1 also supports a hand grip 5 disposed adjacent the forward top end thereof. A safety brake lever 18 is pivotally supported by the housing 1, having a transversely extending guard portion 18a opposite the hand grip 5 and actuated mainly by the operator's left hand. A cover 30 is provided and is conveniently secured to the side portion of the housing 1.

Figure 3:
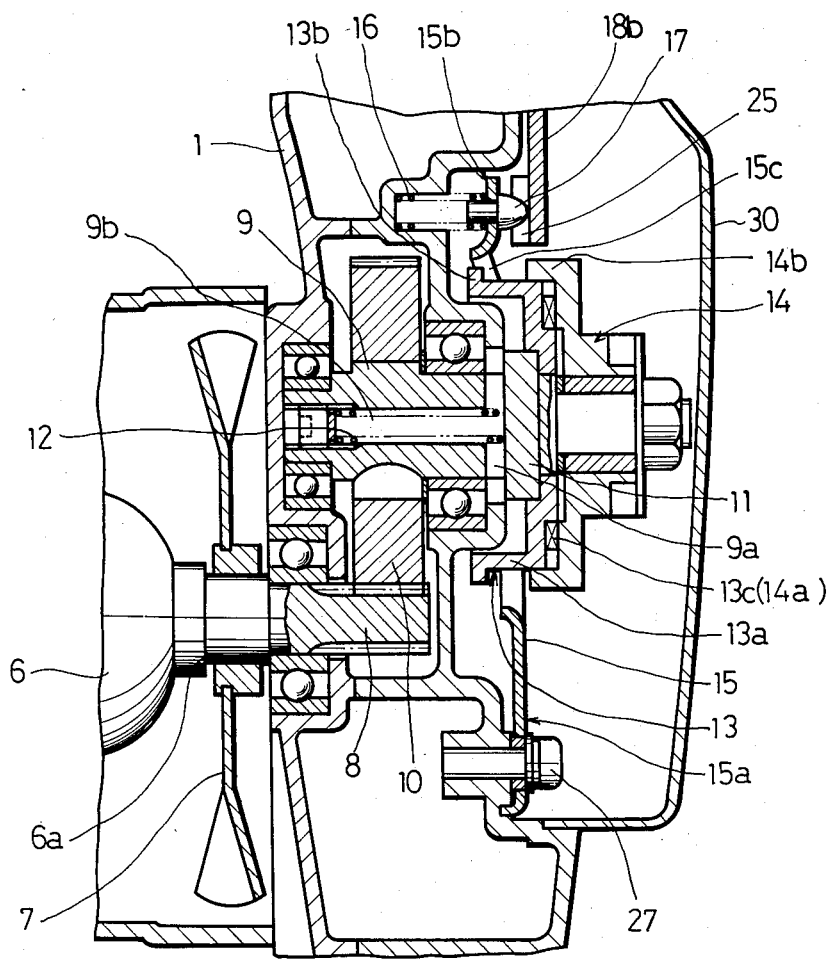
FIG. 3 is a sectional view taken along the line III—III of FIG. 2.

As fragmentarily shown in FIG. 3, an electric motor 6 with a motor shaft 6a is contained within the housing 1 for driving the cutting chain 4. The motor shaft 6a has a fan 7 secured thereto and is formed with a pinion 8 adjacent the forward end thereof.

Rotatably supported within the housing 1 and extending parallel to the motor shaft 6a is a drive shaft 9 which includes a gear 10 secured to the rearward end thereof (the left-hand end as viewed in FIG. 3) for driving engagement with the pinion 8 on the motor shaft 6a. The drive shaft 9 has a vertically extending slot or elongated aperture formed in the axially medial portion thereof for axially movably receiving a key 11 therein. The drive shaft 9 also has an axial bore 9b in which is disposed a spring 12 adapted to normally urge the key 11 forwardly (rightwardly as viewed in FIG. 3).

The key 11 supports an engaging member 13 adapted for axial movement therewith and for rotational movement with the drive shaft 9. The engaging member 13 has a cylindrical wall portion 13a, an annular flange portion 13b projecting from the rearward end of the wall portion 13a, and a serrated clutch surface 13c formed on the forward end surface thereof.

The drive shaft 9 further has an interlocking wheel 14 mounted idly but axially non-movably to the forward end thereof and adapted for driving the cutting chain 4. The interlocking wheel 14 is formed with a serrated clutch surface 14a adapted for meshing engagement with the clutch surface 13c of the engaging member 13 and for transmitting the rotational movement of the engaging member 13 to the interlocking wheel 14. Further, the interlocking wheel 14 has a rearwardly extending wall portion 14b adapted to slidably receive the cylindrical wall portion 13a of the engaging member 13 thereon. Thus, the engaging member 13 is normally urged by the spring 12 against the interlocking wheel 14 so that the respective clutch surfaces 13c and 14a are meshed to rotate the interlocking wheel 14. As should be apparent, when the engaging member 13 is retracted from the interlocking wheel 14, the clutch surface 13a is disengaged from the clutch surface 14a, thereby shutting off the rotational movement of the drive shaft 9 to be transmitted to the interlocking wheel 14.

Figure 2:
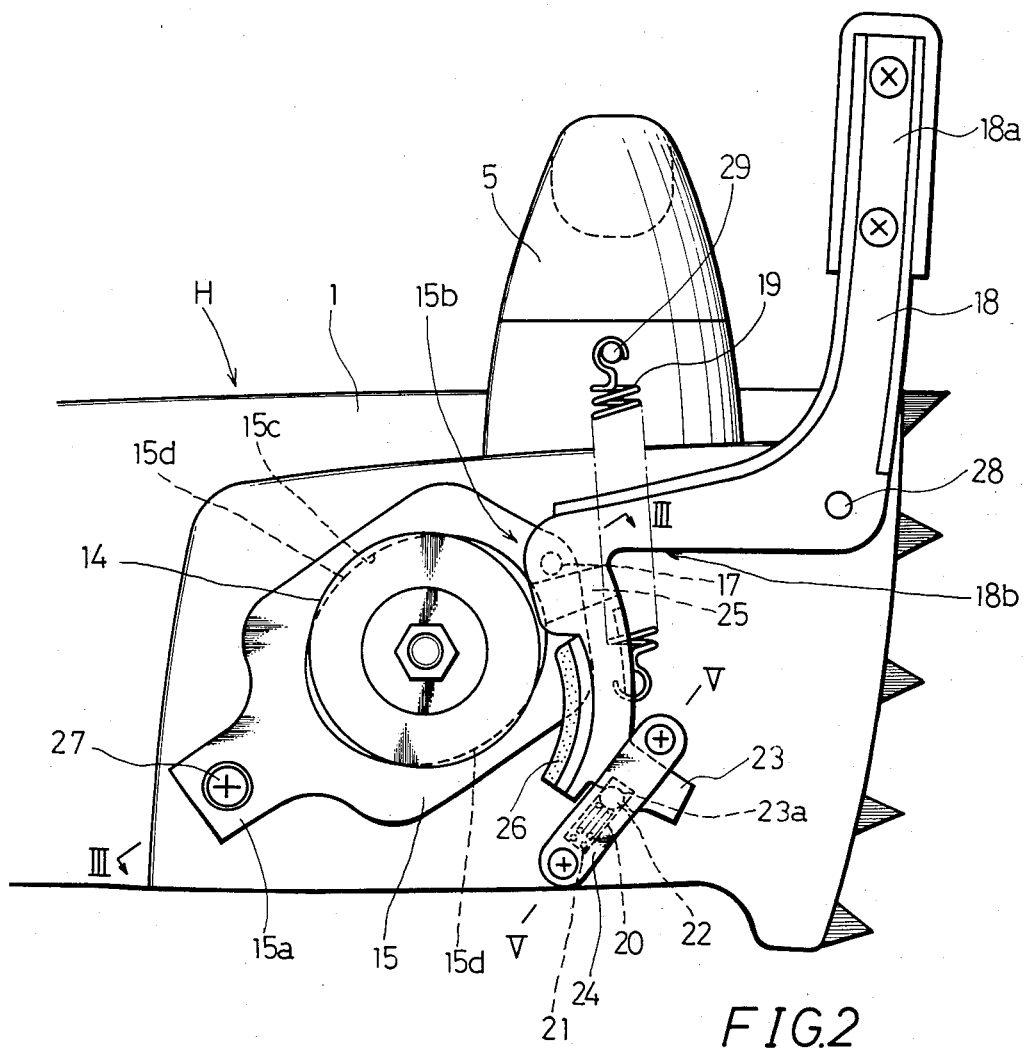
FIG. 2 is an enlarged side elevational view, with the cover removed, showing the essential parts of a chain saw embodying the present invention.

A flexible pushing plate 15 is provided in generally surrounding relation to the engaging member 13 so as to push it rearwardly away from the interlocking wheel 14. Specifically, as best shown in FIG. 2, the pushing plate 15 has a fixed end portion 15a secured to the housing 1 by means of a machine screw 27; and a free end portion 15b movable in the axial direction of the drive shaft 9. The free end portion 15b is biased normally rightwardly by a spring 16, as shown in FIG. 3. A generally oval aperture 15c is formed centrally in the pushing plate 15 for receiving the cylindrical wall portion 13a of the engaging member 13 therethrough. The pushing plate 15 has opposite edge portions 15d along the oval aperture 15c which are adapted to push the flange portion 13b of the engaging member 13 away from the interlocking wheel 14. The pushing plate 15 also has adjacent the free end portion 15b a follower 17 secured thereto and extending thereacross opposite the spring 16. The task of this follower will be explained later in greater detail.

Turning now more specifically to FIG. 2, the safety brake lever 18 is mounted to the housing 1 for swinging movement about a pivot pin 28, the latter being journaled in the housing 1. The brake lever 18 is bent into generally L-shaped configuration to include an actuating portion 18b disposed generally opposite to the interlocking wheel 14. A spring 19 is hooked at one end to the actuating portion 18b, the other end being hooked to a pin generally indicated at 29. Thus, the brake lever 18 is normally urged by the spring 19 clockwise as viewed in FIG. 2.

Figure 5:
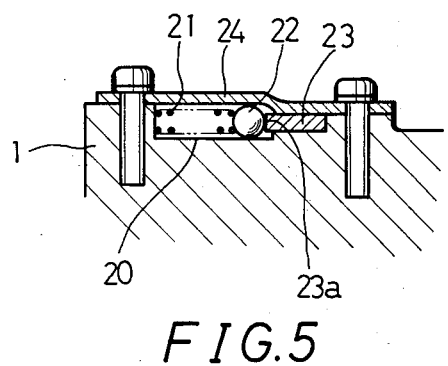
FIG. 5 is a sectional view taken along the line V—V of FIG. 2.
Figure 4:
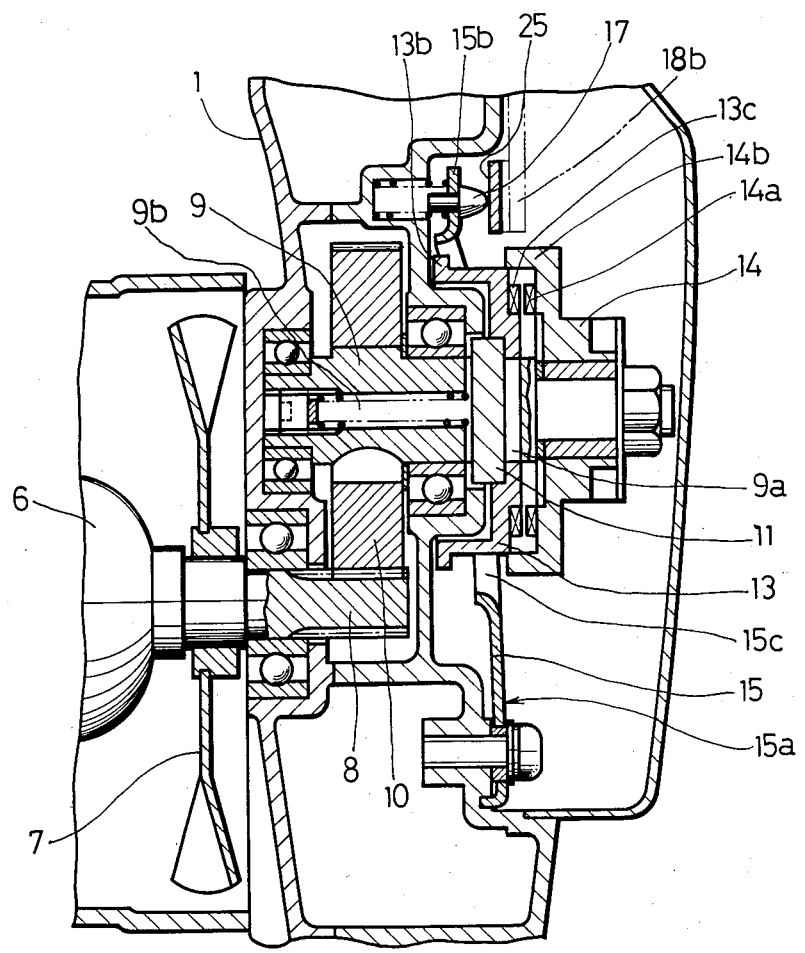
FIG. 4 is a view similar to FIG. 3, showing the essential parts when the brake lever is actuated.

As best shown in FIG. 5, the housing 1 is formed with a recess 20 for receiving a spherical locking member 22 therein, the latter being urged by a spring 21 disposed in the recess 20. A guide plate 24 is provided and is secured to the wall portion of the housing 1 for covering the recess 20 and for guiding a pawl portion 23 of the brake lever 18 now to be described. This pawl portion is formed integrally with the actuating portion 18b of the brake lever 18 and is so configured as to be received between the housing 1 and the guide plate 24. The pawl portion 23 is formed with a concave engaging edge 23a adapted to resiliently and releasably receive the locking member 22. The spring 21 tends to urge the locking member 22 into engagement with the concave engaging edge 23a thereby maintaining the brake lever 18 in its locked position illustrated in FIG. 2. Further, the brake lever 18 has formed on the actuating portion 18b a cam surface 25 disposed generally opposite to the follower 17 and adapted to arcuately travel into and out of contact with the follower 17 upon swinging movement of the brake lever 18 in a clockwise direction. Thus, when the brake lever 18 is actuated, the cam surface 25 moves clockwise thereby pushing the follower 17 and hence the free end portion 15a of the pushing plate 15 rearwardly as shown in FIG. 4. As soon as this occurs, the engaging member 13 is retracted from the interlocking wheel 14, the clutch surface 13c being disengaged from the clutch surface 14a. Further, the brake lever 18 includes adjacent the lower end thereof a braking member 26 disposed slightly below the cam surface 25 and adapted to arcuately move, in synchronism with movement of the cam surface 25, toward and away from the interlocking wheel 14 between a braking position and an inoperative position. Thus, when the brake lever 18 is actuated by engagement with the operator's hand, the concave engaging edge 23a is disengaged from the locking member 22 thereby swinging the brake lever 18 clockwise under the action of the spring 19. Thereupon, the braking member 26 is brought into frictional braking engagement with the outer peripheral surface of the wall portion 14b of the interlocking wheel 14. Thus, the interlocking wheel 14 is urgently braked in synchronism with the disconnection of power transmission thereto, and the movement of the cutting chain 4 is rapidly arrested.

The overall operation and effects of the embodiment described above are as follows.

When the brake lever 18 is swung as a consequence of a kickback, the cam surface on the brake lever 18 presses the engaging member 13 through the follower 17 and thence the pushing plate 15, thereby bringing the engaging member 13 out of meshing engagement with the interlocking wheel 14. As soon as this occurs, the braking member 26, following the arcuate movement of the cam surface 25, is brought into frictional engagement with the interlocking wheel 14. Thus, drive power to the interlocking wheel 14 may be instantaneously shut off, and movement of the cutting chain 4 will be quickly arrested, thereby precluding the risk of operator injury, as in the case of a kickback, and increasing the operator safety.

Particularly, as noted above, the cam surface 25 and the braking member 26 are interrelated so that the movement of the cam surface to push the engaging member 13 is instataneously followed by the movement of the braking member 26 into braking engagement with the interloking wheel 14. Thus, it will be seen that the safety device of the invention provides the following advantages: (1) the brake lever 18 serves to disengage the clutch surface 13c from the clutch surface 14a and at the same time, to apply a braking force to the interlocking wheel 14. Actually these two operations may be effectively simultaneously accomplished thereby reducing the time required to stop the cutting chain 4; (2) the chain saw may be simple in construction by reason of the force of the brake lever 18 which is used both for braking and power shut-off; and (3) in the event of emergency, the braking force may be increased by the kickback force applied to the brake lever 18 in addition to the resilient force of the spring 19.

Figure 6:
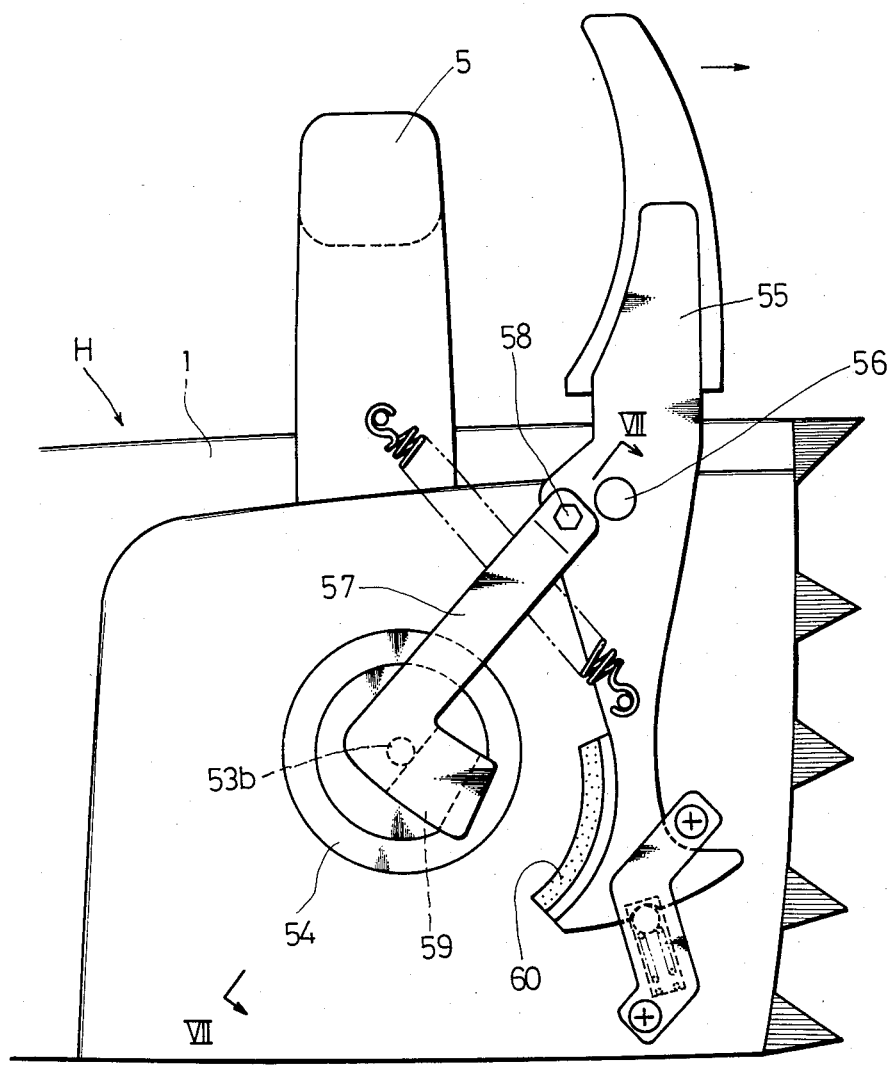
FIG. 6 is an enlarged side elevational view, with the cover removed, showing another embodiment of the present invention.
Figure 7:
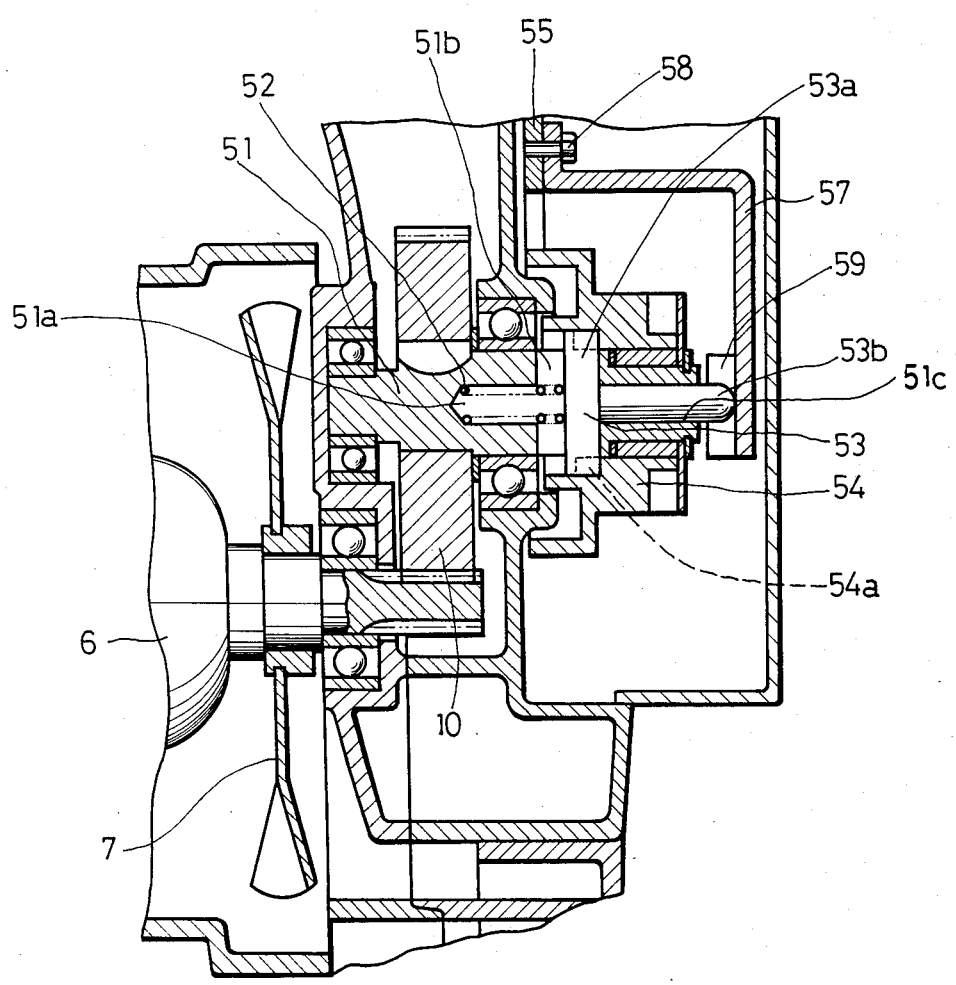
FIG. 7 is a sectional view taken along the line VII—VII of FIG. 6.
Figure 8:
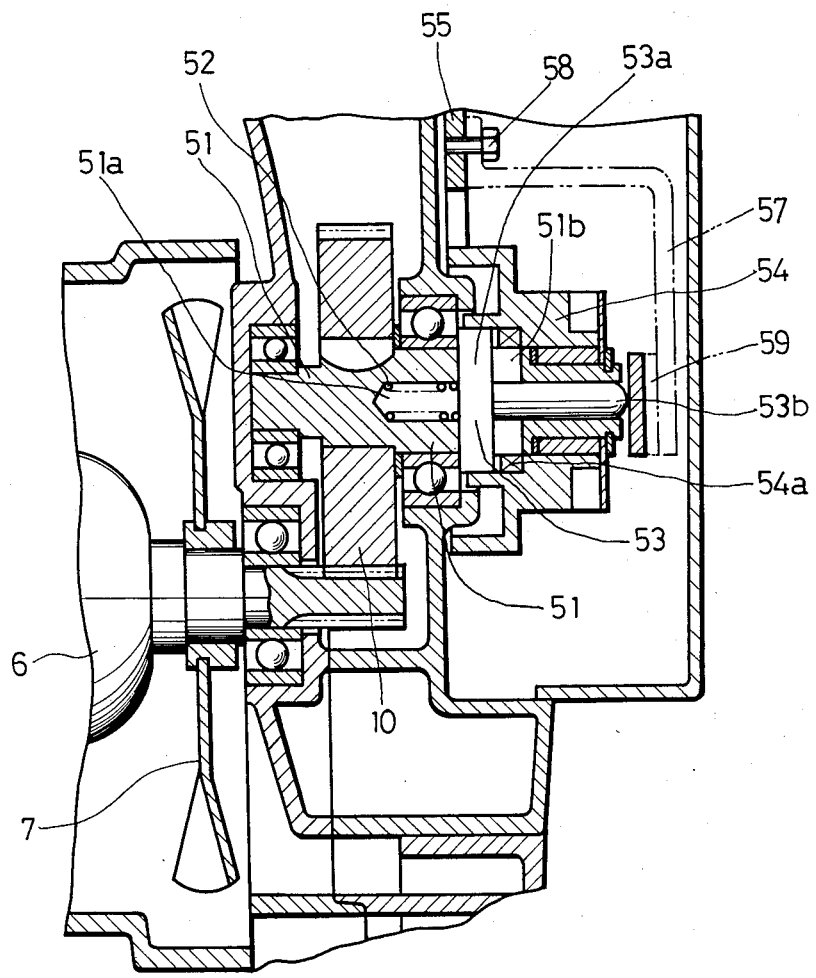
FIG. 8 is a view similar to FIG. 7, showing the essential parts when the brake lever is actuated.

Another embodiment of the invention is illustrated in FIGS. 6 to 8. The difference in this embodiment is that the pushing plate 15 of the first embodiment is not provided, whereas a modified brake lever 55 is provided to directly press an engaging member 53 out of engagement with an interlocking wheel 54. Specifically, as shown in FIG. 7, a drive shaft 51 is provided corresponding to the drive shaft 9 of FIG. 3. The drive shaft 51 has an axial bore 51a in which a spring is positioned; and a vertically extending elongated aperture 51b and axially extending through bore 51c both for receiveing a generally T-shaped engaging member 53 now to be described. This engaging member is in the form of a T-shaped member having a vertically extending key portion 53a adapted for insertion in the aperture 51b of the drive shaft 51 and a pin portion 53b extending normal to the key portion 53a for insertion into the through bore 51c, the length of the pin portion 53b being greater than the akial length of the bore 51c. An interlocking wheel 54 is provided corresponding to the interlocking wheel 14 of FIG. 3 and which has a clutch surface 54a formed thereon in opposed relation to the key portion 53a of the engaging member 53. The engaging member 53 is normally urged by the spring 52 against the interlocking wheel 54, with the key portion 53a engaging the clutch surface 54a and with the pin portion 53b projecting from the distal end of the drive shaft 51, so that the the rotational movement of the drive shaft 51 is transmitted to the interlocking wheel 54.

A brake lever 55 is mounted to the housing 1 for swinging movement about a pivot pin 56. The brake lever 55 includes an arm member 57 secured thereto by means of a bolt 58 and extending generally obliquely toward the interlocking wheel 54. As with the first embodiment, the arm member 57 is formed on the inner surface thereof with a cam surface 59 which is engageable with the pin portion 53b of the engaging member 53 projecting from the drive shaft 51 when the arm member 57 is swung clockwise (as viewed in FIG. 6) along with the brake lever 55. A braking member 60 is provided corresponding to the braking member 26 of FIG. 2. In other respects, the arrangement of the second embodiment is substantially the same as that of the first embodiment. Thus, when the brake lever 55 is swung as a consequence of a kickback, the cam surface 59 of the arm member 57 presses the pin portion 53b of the engaging member 53 thereby separating the key portion 53a from the clutch surface 54a of the interlocking wheel 54. As soon as this occurs, the braking member 60 is brought into frictional braking engagement with the interlocking wheel 54 thereby arresting the movement of the cutting chain 4. In other respects, the operation and effects of this embodiment are the same as those of the first embodiment.

While the invention has been described with reference to preferred embodiments thereof, it is to be understood that modifications or variations may be easily made without departing from the spirit of this invention which is defined by the appended claims.

What is claimed is:

1. In a hand portable chain saw having a housing with a hand grip, a cutting chain, a guide bar projecting forwardly of the housing for supporting the cutting chain for endless movement, an electric motor carried by the housing for driving the cutting chain, and a drive shaft rotatably carried by the housing and operatively connected with the electric motor, the improvement comprising:

an engaging member rotatable with and axially movably supported by said drive shaft and having a clutch surface formed on the forward end thereof;

an interlocking wheel idly but axially non-movably supported by said drive shaft in confronting relation to said engaging member, said interlocking wheel having a clutch surface engageable with said clutch surface of said engaging member for driving said cutting chain;

a flexible pushing plate disposed between the engaging member and interlocking wheel for pushing said engaging member out of driving engagement with said interlocking wheel, said pushing plate having one end secured to said housing and the other end movable in the axial direction of said drive shaft;

a brake lever mounted on said housing for swinging movement in response to engagement by an operator's hand;

a spring engaged between said brake lever and said housing for urging said brake lever in one forward direction;

cam means provided on said brake lever and operable with said engaging member such that, upon swinging movement of said brake lever in said forward direction, said cam means presses said other end of said pushing plate to move said engaging member out of driving engagement with said interlocking wheel;

a braking member secured to said brake lever and operable in unison with the movement of said cam means such that swinging movement of said brake lever moves said braking member into and out of frictional braking engagement with said interlocking wheel between a braking position and an inoperative position in synchronism with the movement of said engaging member out of and into driving engagement with said interlocking wheel; and means for locking said brake lever in opposition to the force of said spring when said braking lever is in its inoperative position.

2. The invention as defined in claim 1 wherein said engaging member has a substantially cup-shaped configuration including a cylindrical wall portion and an annular flange portion formed on the rearward end thereof.

3. The invention as defined in claim 2 wherein said pushing plate further includes an aperture formed centrally therein for receiving said cylindrical wall portion of said engaging member and opposite edge portions abutting on said flange portion of said engaging member and operable to push said engaging member axially rearwardly out of driving engagement with said interlocking wheel when said braking lever is swung forwardly into its operative position.

4. The invention as defined in claim 1 wherein said other end of said pushing plate has fixed thereto a follower engageable with said cam means.

5. The invention as defined in claim 1 wherein said locking means comprises a concave engaging edge formed on said brake lever, a recess formed in said housing, a spherical locking member provided in said recess adjacent said concave engaging edge of said brake lever, a spring provided in said recess for urging said spherical locking member into resilient contact with said concave engaging edge of said brake lever, and a guide plate covering said recess and holding said spherical locking member.

* * * * *